United States Patent Office 3,655,641
Patented Apr. 11, 1972

3,655,641
UNSYMMETRICAL DISAZO PIGMENTS DERIVED FROM DICHLOROBENZIDINE AND ACETYL-ARYLAMIDES
Alexander Hamilton, Glasgow, Scotland, assignor to Ciba-Geigy AG, Basel, Switzerland
No Drawing. Filed June 5, 1969, Ser. No. 830,856
Claims priority, application Great Britain, June 5, 1968, 26,671/68
Int. Cl. C09b 43/00; C09d 11/00
U.S. Cl. 260—176  6 Claims

ABSTRACT OF THE DISCLOSURE

Colourants suitable for use, e.g. in gravure inks, are azo compounds of the formula

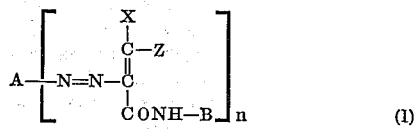  (1)

wherein A represents an unsubstituted or substituted aryl residue; B represents an unsubstituted or substituted aryl residue; X represents an alkyl group having from 1 to 4 carbon atoms or a phenyl group; $n$ represents 1 or 2; and when $n$ is 1, Z represents —NH—Y, wherein Y represents either a group having the formula:

  (II)

or the group:

  (III)

wherein R is an aliphatic radical having from 5 to 18 carbon atoms and Q is an alkylene group having up to 5 carbon atoms, and when $n$ is 2 either each Z represents the group —NH—Y or one Z represents —NH—Y and the other Z is —OH, Y being as defined hereinbefore. The colourants possess greater colour value than those known products obtained by heating together certain azoacylacetarylamides and primary aliphatic amines.

DESCRIPTION OF THE INVENTION

The present invention relates to a new class of azo compounds useful as colourants and to processes for the production of said new azo compounds.

There is described in British patent specification No. 1,096,362 a composition of matter obtained by heating together certain azoacylacetarylamides, with primary aliphatic amines and which is described as being useful in colouration processes.

We have now found that, unexpectedly, by heating a mixture of an azoacylacetarylamide and a branched-chain aliphatic primary amine comprising an α-methyl group, products are obtained which exhibit outstanding properties such as transparency and brightness as a colourant and especially colour values superior to those of the above-mentioned colourants.

Accordingly, the present invention provides compounds of the formula

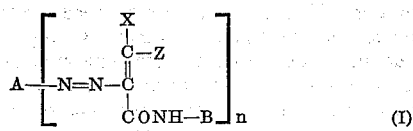  (I)

wherein A represents an unsubstituted or substituted aryl residue; B represents an unsubstituted or substituted aryl residue; X represents an alkyl group having from 1 to 4 carbon atoms or a phenyl group; $n$ represents 1 or 2; and when $n$ is 1, Z represents —NH—Y, wherein Y represents either a group having the formula:

  (II)

or the group:

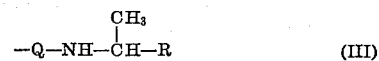  (III)

wherein R is an aliphatic radical having from 5 to 18 carbon atoms and Q is an alkylene group having up to 5 carbon atoms, and when $n$ is 2 either each Z represents the group —NH—Y or one Z represents —NH—Y and the other Z is —OH, Y being as defined hereinbefore. The compounds of Formula I can also be in their desmotropic forms and Formula I is to be understood as including all desmotropic structures.

The group A depending on the definition of $n$ may be, for example, a phenyl or especially a diphenylene residue, each unsubstituted or substituted by one or more halogen, especially chlorine, alkyl groups, especially methyl groups, alkoxy groups, particularly methoxy groups, or nitro groups. It is particularly preferred, however, that the group A is a 3:3′-dichloro-4,4′-diphenylene residue.

The group B may be, for instance, a phenyl residue substituted with one or more alkyl groups having 1 to 4 carbon atoms especially methyl groups, alkoxy groups, having 1 to 4 carbon atoms, especially methoxy groups, halogen, especially chlorine, or nitro groups. However, it is especially preferred that the group B is a phenyl residue.

Suitable examples of the group X are ethyl, n-propyl or phenyl, but it is preferred that X is a methyl group.

When Y is a group represented by the Formula II, the group R specified therein is advantageously an alkyl radical having from 5 to 18 carbon atoms; for instance Y is an α-methylhexyl, α-methyloctyl, α-methyldecyl or an α-methyltetradecyl group. When Y is a group represented by the Formula III, the group R specified therein is advantageously an alkyl group having from 5 to 18 carbon atoms as defined hereinbefore, and the group Q is preferably a trimethylene group. Preferred examples of groups having the Formula III are 3-(2′-heptylamino)propyl, 3-(2′-nonylamino)propyl, 3-(2′-undecylamino)propyl and 3-(2′-pentadecylamino)propyl groups.

Examples of preferred final compounds of the present invention are those of the Formula I wherein A represents a 3,3′ - dichloro - 4,4′ - diphenylene residue; B represents a phenyl group; X represents a methyl group; $n$ is 2, and each Z is —NH—Y or one Z is —NH—Y and the other Z is OH, wherein Y represents an α-methylhexyl, α-methyl-tetradecyl 3-(2′-undecylamino)-propyl or 3-(2′-pentadecyl-amino)-propyl group.

The present invention also provides, as a second aspect, a process of producing a compound of Formula I as hereinbefore defined, or a mixture comprising compounds of Formula I, which process comprises heating one or more compounds having the formula:

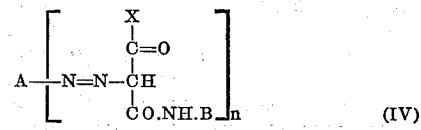  (IV)

wherein A, B, X and $n$ are as hereinbefore defined, with a branched-chain aliphatic primary amine of the formula

  (V)

wherein Y is as hereinbefore defined.

The process of the present invention is believed to proceed by elimination of the elements of water between the carbonyl group of the acyl portion of the compound of Formula IV and the primary amine group of the aliphatic amine Y—NH₂. However, it should be understood that the process of this invention is not limited by this or any other reaction mechanism.

The process according to the second aspect of the present invention may be conveniently effected by heating a previously prepared aqueous suspension of the azoacylacetarylamide compound of Formula IV with 1 or 2 mols of the branched-chain aliphatic primary amine Y—NH₂ at a temperature within the range, for instance, of from 50° to 200° C., more preferably within the range of from 70° to 150° C. The desired product of Formula I may be isolated from the reaction mixture by conventional techniques, for instance, by filtration. The product may then be purified, for example, by washing and drying. If desired, the process according to the second aspect of this invention may be effected by milling together with heating a mixture of the dry compound of Formula IV with the liquid branched-chain aliphatic primary amine, optionally in the presence of an organic solvent substantially inert under the conditions of the reaction, for example an aromatic hydrocarbon such as benzene, toluene, xylene or a lower dialkylamide such as dimethylformamide.

Azoacylacetarylamides of Formula IV suitable for use in the process according to the second aspect of this invention are for example, 2 - (4'-methyl-2'-nitrobenzeneazo)-acetoacetanilide, 2 - (4'-chloro-2'-nitrobenzeneazo) acetoacetanilide and especially 2:2' - (3:3'-dichloro-4:4'-diphenylenedisazo)-bis-acetoacetanilide.

The azoacylacetarylamides of Formula IV may be produced in a convenient manner by a diazotisation and coupling technique. Thus the diazo component and the coupling component of the azo compound of Formula IV may be coupled under conventional reaction conditions, normally in aqueous media. This aqueous reaction mixture may then be employed directly in the process according to the second aspect of this invention as hereinbefore described.

Among branched-chain aliphatic primary amines of Formula V suitable for use in the aforesaid process there may be mentioned, for instance, α-methylhexylamine, α-methyloctylamine, α-methyldecylamine, α-methyldodecylamine, α - methyltetradecylamine, N-α-methyl-hexyl-propylenediamine, N - α-methyl-octyl-propylenediamine, and more preferably, N-α-methyl-decyl-propylenediamine and N-α-methyl-tetradecyl-propylenediamine.

The present invention further provides, as a third aspect, a process of producing a compound of Formula I comprising condensing a mixture of an acylacetarylamide having the formula:

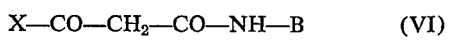
X—CO—CH₂—CO—NH—B      (VI)

wherein X and B are as hereinbefore defined and a branched-chain aliphatic primary amine of the formula:

Y—NH₂      (V)

wherein Y is as hereinbefore defined, and coupling the resulting condensation product with a diazonium compound of an amine having the formula:

A(NH₂)ₙ      (VII)

wherein A and n are as hereinbefore defined.

The process according to the third aspect of the present invention may be conveniently effected by adding the amine Y—NH₂, in the form of a water-soluble salt, especially the acetate, to an aqueous alkaline solution containing the compound VI, adding the diazonium compound of the amine of Formula VII, and, after the coupling reaction is complete, rendering the mixture alkaline for instance to a pH value of 11 or 12 with aqueous alkali metal hydroxide and heating the alkaline mixture to an elevated temperature, for instance to the boil. The reaction mixture may be held at the elevated temperature for a period of, for example, from 10 minutes up to four hours; although heating for a period of from 30 minutes up to two hours is normally sufficient to ensure adequate reaction. The product so obtained may then be separated by filtration, washed free from water-soluble material and dried, for instance in an electrically-heated oven.

The compounds of Formula I of the present invention are yellow dyestuffs which are readily soluble in aromatic hydrocarbon solvents such as toluene. Thus they dissolve in publication gravure inks based on hydrocarbon solvents. The presence of a minor proportion of such a compound intimately mixed with a conventional azo pigmentary dyestuff of Formula IV confers ease of dispersion on the whole bulk composition and gives to the composition improved tinctorial strength and flow properties, compared with untreated pigment, when incorporated in gravure ink media.

Since it is usually advantageous, in terms of pigmentary properties, to produce a pigment having some of the characteristic properties of the compound of Formula IV it is generally preferred to use a proportion of the amine Y-NH₂ lower than the stoichiometric proportion required for complete conversion of the compound of Formula IV to the compound of Formula I. It is also usually advantageous in terms of dispersibility and rheological properties if a proportion of unreacted amine of Formula V is present.

The present invention therefore provides as a fourth aspect a composition comprising a compound or compounds having the Formula I as hereinbefore defined and an azoacylacetarylamide having the Formula IV as hereinbefore defined.

The compositions of the present invention may be produced either by reacting or partially reacting together, in appropriate relative molar proportions, an azoacylacetaryl amide having the Formula IV with a branched-chain aliphatic primary amine of the above Formula V, or by condensing or partially condensing, an acylacetarylamide having the Formula VI with a branched-chain amine of Formula V and coupling the resulting product with the diazonium compound of an amine having the Formula VII.

During the preferred reactions to produce the compositions of the present invention it is advantageous to employ for each molar equivalent of azoacylacetarylamide of Formula IV or acylacetarylamide of Formula VI, from 0.02 to 0.9 molar equivalents of the amine Y—NH₂, and preferably from 0.1 to 0.6 molar equivalent of this amine.

In addition to the essential components defined hereinbefore, the composition of the present invention may advantageously contain a low proportion of the free amine of Formula V.

The compositions of the present invention are especially suitable for the colouration of gravure inks which are essentially solutions of resins e.g. metallic resinates in hydrocarbon solvents. They show outstanding ease of dispersion in this type of ink, and complete dispersion can be obtained in a short time by simple stirring as opposed to the prolonged milling process required for the dispersion of conventional pigments. Gravure inks containing the compositions of the present invention exhibit much superior colour value and rheological properties compared with similar gravure inks containing previously known colourants.

The following examples further illustrate the present invention. Parts by weight expressed therein bear the same relation to parts by volume as do kilograms to litres.

EXAMPLE 1

To an aqueous mixture containing 84 parts by weight of Colour Index Pigment Yellow 12 (produced by tetrazotisation of 33.8 parts 3.3'-dichlorbenzidine and coupling with 47.3 parts acetoacetanilide) and 30 parts by weight of Duomeen L–11 (3-(2'-undecylamino)propylamine– Duomeen is a trademark) dissolved in 12 parts by weight of glacial acetic acid maintained at 25° C., was added sufficient 10% aqueous sodium hydroxide solution to fully neutralize the amine salt and to ensure that a slight excess of sodium hydroxide was present. The mixture was heated to the boil and held at the boil for one hour. At the end of this time, the product was separated by filtration, washed thoroughly with water and dried in an oven maintained at 50° C.

In this way, 114 parts by weight of a yellow colourant were obtained, which on infrared spectroscopic examination was shown to contain an azoic colouring material having an entirely different structure from the of the Pigment Yellow 12 starting-material.

EXAMPLE 2

To a solution of 99 parts acetoacetanilide and 21.6 parts sodium hydroxide in 1500 parts water at 15° C. were added 23 parts of acetic acid in 300 parts water and a solution containing 60 parts of Duomeen L15 (3-(2'-pentadecylamino)-propylamine) and 20 parts acetic acid in 600 parts water. A solution prepared by tetrazotisation of 67.2 parts 3.3'-dichlorbenzidine was then run in while at the same time a 10% solution of sodium hydroxide was added to maintain the reaction pH at 5.0. When the tetrazo solution had reacted completely a further quantity of 10% sodium hydroxide was added until a slight excess was present in the reaction mixture. The reaction mixture was then boiled for 1 hour and the precipitated product was separated by filtration, washed with water to remove soluble impurities, and dried at 50° C.

The product was a yellow colouring material of especial value in the colouration of publication gravure inks due to its great ease of dispersion and high colour strength. It contained 8.2% of a yellow chloroform-soluble dyestuff having an infra-red spectrum distinctly different from that of Pigment Yellow 12 and having the following elemental analysis:

Calculated for $C_{68}H_{102}Cl_2N_{10}O_2$ (percent): C, 70.25; H, 8.85; N, 12.05; O, 2.75; Cl, 6.1. Found (percent): C, 70.2; H, 8.75; N, 11.8; O, 2.75; Cl, 6.5.

$C_{68}H_{102}Cl_2N_{10}O$ is the formula of the condensation product which would be formed when Pigment Yellow 12 is reacted with Duomeen L15 to give a compound of general Formula I in which each Z represents the group

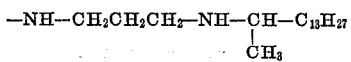

EXAMPLE 3

When the Duomeen L-11 amine employed in Example 1 was replaced by the equivalent amount of Armeen L-7 (1-methyl-n-hexylamine; Armeen is a trademark), the reaction conditions being otherwise substantially the same, a product having similar properties to those of the product of Example 1 was produced.

EXAMPLE 4

When the Duomeen L-11 amine employed in Example 1 was replaced by the equivalent amount of Armeen L-11 (1-methyl-n-decylamine), the reaction conditions being otherwise substantially the same, a product having similar properties to those of the product of Example 1 was obtained.

EXAMPLE 5

10 parts by weight of Colour Index Pigment Yellow 12 were gradually mixed with 25 parts by weight of Duomeen L-15 (3-(2'-pentadecylamino)propylamine) at 100° to 120° C. After stirring for 17 hours at this temperature a clear browny syrupy liquid was obtained. After cooling this was taken up in 200 parts by weight of cold ethanol, and a reddish-brown product separated out from the mixture. This precipitate was filtered off, washed with ethanol, and dried at 50–55° C.

The product was very soluble in toluene and chloroform and had an infra-red spectrum identical to that of the yellow chloroform-soluble dyestuff described in Example 2, second paragraph.

EXAMPLE 6

52.4 parts by weight of Duomeen L–15 and 26.3 parts by weight of acetoacetanilide were stirred together in 100 parts by weight of ethanol at room temperature for 1 hour. The resulting solution was added with stirring over a period of ten minutes to an aqueous diazo solution, prepared from 25 parts by weight of 4-chloro-2-nitro-aniline and made non-acid to Congo Red by addition of sodium acetate. Stirring was continued until all of the diazo compound had reacted, maintaining the temperature below 20° C. by addition of ice. The pH of the resulting colour slurry was brought to 9.5–10.0 by addition of dilute ammonia solution, and the brownish-yellow product separated by filtration and dried at 55° C.

The infra-red spectrum indicated that the product was a compound of the type of Formula I in which $n$ represents 1 and A represents

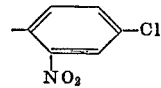

It was a brown solid of low melting-point which dissolved easily in chloroform to give a yellow solution.

EXAMPLE 7

When 25 parts by weight of 4-chloro-2-nitroaniline employed in Example 6 were replaced by 22.1 parts by weight of 4-methyl-2-nitroaniline, the reaction conditions being otherwise substantially the same, a product having similar properties to that of Example 6 was obtained. The infra-red spectrum indicated that the product was of general Formula I in which $n$ represents 1 and A represents

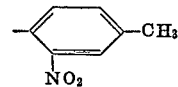

EXAMPLE 8

37 parts by weight Duomeen L–15 were dissolved in 100 parts by weight of methanol. 18.6 parts by weight of acetoacetanilide were added and the resulting solution was stirred at room temperature for 1 hour.

300 parts by weight of an aqueous solution of tetrazotised 3.3'-dichlorobenzidine at 5° to 10° C. (made from 12.65 parts by weight of 3.3'-dichlorobenzidine) were mixed with sufficient sodium acetate to make the solution non-acid to Congo Red.

The alcoholic solution prepared above was added to the tetrazo solution over 10 minutes with stirring, and the resulting slurry was stirred until all of the tetrazo compound had reacted. The temperature was kept below 20° C. with ice.

The pH of the slurry was brought to 9.5 to 10.0 with dilute ammonia solution, and the reddish-brown product was separated by filtration, washed free of water-soluble impurities, and dried at 50–55° C.

The product was recrystallised from chlorobenzene/ethanol mixture to give a bright reddish-yellow compound. The infra-red spectrum indicated that this was of the type of general Formula I in which $n$ represents 2, one Z represents —OH and the other Z represents

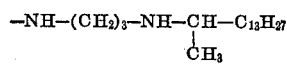

EXAMPLE 9

10 parts by weight of the product of Example 2 were dispersed during a period of 30 minutes and using a high-speed stirrer, in 100 parts by weight of a publication gravure ink medium consisting essentially of a solution of a zinc/calcium resinate in a mixed hydrocarbon solvent (approximately 2:1 aliphatic/aromatic).

At the end of this time, the pigment was fully dispersed and the resulting ink showed a 20% greater colour value compared with an ink made up using a pigment produced according to Example 2 of the present invention but employing Duomeen T (3-(octadecylamino)-propylamine) instead of the Duomeen L–15 actually employed therein.

I claim:

1. A compound of the formula

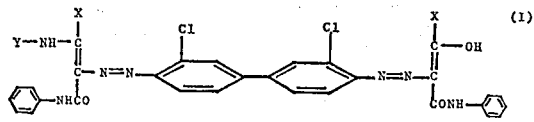

wherein X is alkyl having from 1 to 4 carbons or phenyl,
and Y is either

or

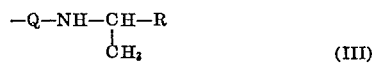

wherein R is alkyl of 5 to 18 carbons, and Q is alkylene of at most 5 carbons.

2. A compound as claimed in claim 1 wherein Y is selected from the group consisting of α-methyl hexyl, α-methyl tetradecyl, 3-(2′-undecylamino)-propyl and 3-(2′-pentadecylamino)-propyl.

3. A compound as claimed in claim 1 wherein X is methyl.

4. A compound as claimed in claim 1 wherein the group Y has the Formula II and R is alkyl of from 5 to 18 carbon atoms.

5. A compound as claimed in claim 4 wherein R is selected from α-methyl hexyl, α-methyl octyl, α-methyl decyl and α-methyl tetradecyl.

6. A compound as claimed in claim 1 wherein the group Y has the Formula III wherein R is alkyl of from 5 to 18 carbon atoms and Q is trimethylene.

References Cited
FOREIGN PATENTS 1,096,362 12/1967 Great Britain _____ 260—176
1,527,377 4/1968 France _____ 260—176

FLOYD D. HIGEL, Primary Examiner

U.S. Cl. X.R.

106—20, 23, 288 Q, 308 N; 260—144, 193